(12) United States Patent
Meng et al.

(10) Patent No.: US 11,575,838 B2
(45) Date of Patent: Feb. 7, 2023

(54) SYSTEMS AND METHODS FOR DETERMINING A TARGET FIELD ANGLE OF AN IMAGE CAPTURING DEVICE

(71) Applicant: ZHEJIANG DAHUA TECHNOLOGY CO., LTD., Zhejiang (CN)

(72) Inventors: Chengzhe Meng, Hangzhou (CN); Huadong Pan, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/325,239

(22) Filed: May 20, 2021

(65) Prior Publication Data
US 2021/0274100 A1 Sep. 2, 2021

Related U.S. Application Data

(63) Continuation of application No. PCT/CN2019/091651, filed on Jun. 18, 2019.

(30) Foreign Application Priority Data

Dec. 4, 2018 (CN) .......................... 201811476158.0

(51) Int. Cl.
*H04N 5/232* (2006.01)
*G06T 7/80* (2017.01)

(52) U.S. Cl.
CPC .......... *H04N 5/23296* (2013.01); *G06T 7/80* (2017.01); *H04N 5/23216* (2013.01)

(58) Field of Classification Search
CPC .......... H04N 5/23296; H04N 5/23216; H04N 5/23206; H04N 17/002; H04N 5/23299; G06T 7/80; G06T 2207/10016
See application file for complete search history.

(56) References Cited

U.S. PATENT DOCUMENTS

2006/0209186 A1  9/2006  Iyoda et al.
2008/0056613 A1  3/2008  Hatanaka et al.
(Continued)

FOREIGN PATENT DOCUMENTS

CN   101719986 A   6/2010
CN   103198487 A   7/2013
(Continued)

OTHER PUBLICATIONS

International Search Report in PCT/CN2019/091651 dated Sep. 17, 2019, 4 pages.
(Continued)

*Primary Examiner* — Mekonnen D Agnew
(74) *Attorney, Agent, or Firm* — Metis IP LLC

(57) ABSTRACT

The present disclosure relates to systems and methods for determining automatically a target field angle of an image capturing device. The method may include obtaining, by the image capturing device, at least two images for determining a target field angle of the image capturing device. The method may also include obtaining a field angle range of the image capturing device. Further, the method may include determining the target field angle by matching the at least two images based on the field angle range.

17 Claims, 9 Drawing Sheets

(56) References Cited

U.S. PATENT DOCUMENTS

| | | | |
|---|---|---|---|
| 2011/0243388 A1* | 10/2011 | Sakaguchi | G06F 3/011 |
| | | | 345/619 |
| 2013/0176432 A1 | 7/2013 | Gupta et al. | |
| 2013/0182152 A1 | 7/2013 | Li | |
| 2013/0194110 A1 | 8/2013 | Kim et al. | |
| 2020/0226816 A1* | 7/2020 | Kar | G06T 15/005 |

FOREIGN PATENT DOCUMENTS

| | | |
|---|---|---|
| CN | 103310448 A | 9/2013 |
| CN | 103716594 A | 4/2014 |
| CN | 103837143 A | 6/2014 |
| CN | 104125433 A | 10/2014 |
| CN | 104301676 A | 1/2015 |
| CN | 105486235 A | 4/2016 |
| CN | 105716582 | 6/2016 |
| CN | 106530358 A | 3/2017 |
| CN | 106709953 A | 5/2017 |
| CN | 107888907 A | 4/2018 |
| CN | 108020158 A | 5/2018 |
| WO | 2020113937 A1 | 6/2020 |

OTHER PUBLICATIONS

Written Opinion in PCT/CN2019/091651 dated Sep. 17, 2019, 5 pages.

First Office Action in Chinese Application No. 201811476158.0 dated May 27, 2020, 15 pages.

Liao, Hsien-Chou et al., An Automatic Calibration Method Based on Feature Point Matching for the Cooperation of Wide-angle and Pan-tilt-zoom Cameras, information Technology & Control, 2011, 8 pages.

Lin, Zongjian et al., Accuracy Analysis of Low Altitude Photogrammetry with Wide-angle Camera, Acta Geodaetica et Cartographica Sinica, 2014, 8 pages.

Christian Herdtweck et al., Monocular Car Viewpoint Estimation with Circular Regression Forests, 2013 IEEE Intelligent Vehicles Symposium (IV), 2013, 8 pages.

The Extended European Search Report in European Application No. 19893381.4 dated Nov. 15, 2021, 9 pages.

\* cited by examiner

200

---

Obtaining a first image and second image captured in sequence by a dome camera, wherein the second image is captured after rotating the dome camera at a predetermined angle — 201

Obtaining a field angle range of the dome camera, determining matching errors between overlapped pixels of the first image and the second image at different field angles within the field angle range, and obtaining a target field angle based on a field angle with a smallest matching error — 202

810 — Obtaining, by an image capturing device, at least two images for determining a target field angle of the image capturing device 820 — Obtaining a field angle range of the image capturing device 830 — Determining the target field angle by matching the at least two images based on the field angle range

FIG. 8

SYSTEMS AND METHODS FOR DETERMINING A TARGET FIELD ANGLE OF AN IMAGE CAPTURING DEVICE

CROSS-REFERENCE TO RELATED APPLICATIONS

This application is a continuation of International Patent Application No. PCT/CN2019/091651, filed on Jun. 18, 2019, which claims priority to Chinese Application No. 201811476158.0, filed on Dec. 4, 2018, the contents of each of which are hereby incorporated by reference.

TECHNICAL FIELD

The present disclosure relates to a technical field of image processing, and in particular relates to a method and system for determining a field angle of an image capturing device (e.g., a dome camera).

BACKGROUND

Field angle is one of important parameters for an image capturing device (e.g., a dome camera), and there is a calibration value of the field angle for the image capturing device. The calibration value usually is an appropriate approximation for marking or identifying the field angle of the image capturing device and generally determined by a manufacturer according to a manufacturing process. However, sometime there is need of an accurate actual field angle. For example, in an application scenario, an image captured by the image capturing device is used to position a subject in another image based on the calibration value. Since the calibration value is the approximation, i.e., not an actual field angle of the image capturing device, (e.g., determining a particular subject that needs to shield, positioning a vehicle registration plate) the actual field angle needs to be determined first.

Taking a dome camera as the image capturing device as an example, the dome camera integrates a camera, a pan-tilt-zoom (PTZ) system, a decoder and a shield, and correspondingly has various functions, e.g., the dome camera can be used to monitor a relatively wide region. The dome camera has different zoom ratios, and each zoom ratio corresponds to a target field angle. However, the target field angle and a mechanical structure of a core of the dome camera has no simply linear relationship. In order to realize fine control requirements, the target field angle thus needs to be determined at each zoom ratio.

In the prior art, the field angle of the dome camera is mainly determined manually. For example, a field angle is assumed first, then a positive/negative error of 3D positioning may be observed, and the field angle increases or decreases accordingly until the accuracy of the field angle meets the requirements. Obviously, in the prior art, the process for determining the field angle of the dome camera results in high labor costs, and the process is complicated and cumbersome, and not suitable for use in many application scenarios.

SUMMARY

The present disclosure may provide a method and device for determining a target field angle, and determine automatically the target field angle, thereby reducing labor costs, and the process is simple and efficient, and suitable for use in many application scenarios.

In a first aspect of the present disclosure, a method for determining a target field angle of a PTZ camera may be provided. The method may include obtaining a first image and second image captured in sequence by the PTZ camera. The second image may be captured after rotating the PTZ camera at a predetermined angle. Tilt coordinates or pan coordinates of the PTZ camera may remain same when the first image and the second image are captured by the PTZ camera. The method may also include obtaining a field angle range of the PTZ camera and determining matching errors between overlapped pixels of the first image and the second image at different field angles within the field angle range. The method may also include obtaining the target field angle based on a field angle with a smallest matching error.

In some embodiments, the obtaining a field angle range of the PTZ camera; determining matching errors between overlapped pixels of the first image and the second image at different field angles within the field angle range; and obtaining the target field angle based on a field angle with a smallest matching error may include: within the field angle range of the PTZ camera, performing a following iteration operation until a difference between a newly determined $j^{th}$ field angle and a newly determined $k^{th}$ field angle is smaller than or equal to a threshold, and obtaining the target field angle based on the newly determined $j^{th}$ field angle and the newly determined $k^{th}$ field angle: dividing the field angle range into N equal portions and obtaining (N+1) field angles; for each field angle, determining the matching error between overlapped pixels of the first image and the second image, thereby obtaining (N+1) matching errors corresponding to the (N+1) field angles; selecting a field angle with a smallest matching error from the (N+1) matching errors, designating a range from a $j^{th}$ field angle and a $k^{th}$ field angle as a newly determined field angle range if a difference between the $j^{th}$ field angle and the $k^{th}$ field angle is greater than a threshold. The field angle with the smallest matching error from the (N+1) matching errors may be before $k^{th}$ field angle and after the $j^{th}$ field angle. N may be an integer greater than 2, j and k may be integers greater than 2 and smaller than N.

In some embodiments, the obtaining the target field angle based on the newly determined $j^{th}$ field angle and the newly determined $k^{th}$ field angle may include: obtaining an average field angle of the newly determined $j^{th}$ field angle and the newly determined $k^{th}$ field angle; and determining the average field angle as the target field angle.

In some embodiments, the rotating the PTZ camera with a predetermined angle may include: horizontally rotating the PTZ camera at the predetermined angle, tilt coordinates remaining same and being zero when the first image and the second image are captured by the PTZ camera; or vertically rotating the PTZ camera at the predetermined angle, the pan coordinates remaining same and being zero when first image and the second image are captured by the PTZ camera.

In some embodiments, the predetermined angle may be smaller than a calibration field angle of the PTZ camera.

In a second aspect of the present disclosure, a device for determining a target field angle of a PTZ camera may be provided. The device may include an obtaining unit and a determination unit. The obtaining unit may be configured to obtain a first image and second image captured in sequence by the PTZ camera. The second image may be captured after rotating the PTZ camera at a predetermined angle. Tilt coordinates or pan coordinates of the PTZ camera may remain same when the first image and the second image are captured by the PTZ camera. The determination unit may be configured to obtain a field angle range of the PTZ camera, determine matching errors between overlapped pixels of the first image and the second image in different field angles within the field angle range, and obtain the target field angle based on a field angle with a smallest matching error.

In some embodiments, the determination unit may be also configured to, within the field angle range of the PTZ camera, perform a following iteration operation until a difference between a newly determined $j^{th}$ field angle and a newly determined $k^{th}$ field angle is smaller or equal to a threshold, and obtain the target field angle based on the newly determined $j^{th}$ field angle and the newly determined $k^{th}$ field angle: dividing the field angle range into N equal portions and obtaining (N+1) field angles; for each field angle, determining the matching error between overlapped pixels of the first image and the second image, thereby obtaining (N+1) matching errors corresponding to the (N+1) field angles; selecting a field angle with a smallest matching error from the (N+1) matching errors, designating a range from a $j^{th}$ field angle and a $k^{th}$ field angle as a newly determined field angle range if a difference between the $j^{th}$ field angle and the $k^{th}$ field angle is greater than a threshold. The field angle with the smallest matching error from the (N+1) matching errors may be before $k^{th}$ field angle and after the $j^{th}$ field angle. N may be an integer greater than 2, j and k may be integers greater than 2 and smaller than N.

In some embodiments, the determination unit may be also configured to obtain an average field angle of the newly determined $j^{th}$ field angle and the newly determined $k^{th}$ field angle and determine the average field angle as the target field angle.

In some embodiments, the rotating the PTZ camera with a predetermined angle may include: horizontally rotating the PTZ camera at the predetermined angle, the tilt coordinates remaining same and being zero when the first image and the second image are captured by the PTZ camera; or vertically rotating the PTZ camera at the predetermined angle, the pan coordinates remaining same and being zero when the first image and the second image are captured by the PTZ camera.

In some embodiments, the predetermined angle may be smaller than a calibration field angle of the PTZ camera.

In the present disclosure, the first image and the second image captured in sequence by the PTZ camera may be obtained. The second image may be captured after rotating the PTZ camera at the predetermined angle. Tilt coordinates or pan coordinates of the PTZ camera may remain same when the first image and the second image are captured by the PTZ camera. Then the field angle range of the PTZ camera may be obtained and matching errors between overlapped pixels of the first image and the second image at different field angles within the field angle range may be determined. Further, the target field angle may be obtained based on a field angle with a smallest matching error. The target field angle of the PTZ camera may be thus determined automatically, thereby reducing labor costs, and the process is simple and efficient, and suitable for use in many application scenarios.

In a third aspect of the present disclosure, a system for determining automatically a field angle of an image capturing device may be provided. The system may include at least one storage medium and at least one processor in communication with the at least one storage medium. The at least one storage medium may include a set of instructions. When executing the set of instructions, the at least one processor may be directed to: obtain, by an image capturing device, at least two images for determining a target field angle of the image capturing device; obtain a field angle range of the image capturing device; and determine the target field angle by matching the at least two images based on the field angle range.

In some embodiments, the at least two images may include a first image obtained in a first view and a second image obtained in a second view, and a first portion of the first image may overlap a second portion of the second image. To determine the target field angle by matching the at least two images based on the field angle range, the at least one processor may be directed to: determine the target field angle by matching the first portion of the first image and the second portion of the second image based on the field angle range.

In some embodiments, to determine the target field angle by matching the first portion of the first image and the second portion of the second image based on the field angle range, the at least processor may be also directed to: initiate an iteration process for determining the target field angle, and a first iteration in the iteration process may include: obtaining a plurality of field angles within the field angle range; for each field angle of the plurality of field angles, determining a matching error between the first portion of the first image and the second portion of the second image based on the field angle; determining a reference field angle with a smallest matching error among the plurality of field angles; determining a difference between a preceding field angle before the reference field angle and a subsequent field angle after the reference field angle; in response to a determination that the difference is smaller than or equal to a threshold, determining the target field angle based on the preceding field angle and the subsequent field angle; and in response to a determination that the difference is greater than the threshold, determine a new field angle range based on the preceding field angle and the subsequent field angle, and perform a next iteration based on the new field angle range.

In some embodiments, the at least one processor may be directed to terminate the process until a new field angle range whose difference is smaller than or equal to the threshold is generated.

In some embodiments, the determining a matching error between the first portion of the first image and the second portion of the second image based on the field angle may include: determining a point matching error between each point in the first portion of the first image and a corresponding point in the second portion of the second image; and determining the matching error based on point matching errors.

In a fourth aspect of the present disclosure, a method for determining a target field angle may be provided. The method may be implemented on a computing device having at least one processor, at least one storage medium, and a communication platform connected to a network. The method may include: obtaining, by an image capturing device, at least two images for determining a target field angle of the image capturing device; obtaining a field angle range of the image capturing device; and determining the target field angle by matching the at least two images based on the field angle range.

In some embodiments, the at least two images may include a first image obtained in a first view and a second image obtained in a second view, and a first portion of the first image overlaps a second portion of the second image. The determining the target field angle by matching the at least two images based on the field angle range may include: determining the target field angle by matching the first portion of the first image and the second portion of the second image based on the field angle range.

In some embodiments, the determining the target field angle by matching the first portion of the first image and the second portion of the second image based on the field angle range may include: initiating an iteration process for determining the target field angle. A first iteration in the iteration process may include: obtaining a plurality of field angles within the field angle range; for each field angle of the plurality of field angles, determining a matching error between the first portion of the first image and the second portion of the second image based on the field angle; determining a reference field angle with a smallest matching error among the plurality of field angles; determining a difference between a preceding field angle before the reference field angle and a subsequent field angle after the reference field angle; in response to a determination that the difference is smaller than or equal to a threshold, determining the target field angle based on the preceding field angle and the subsequent field angle; and in response to a determination that the difference is greater than the threshold, determine a new field angle range based on the preceding field angle and the subsequent field angle, and perform a next iteration based on the new field angle range.

In some embodiments, the method may further include: terminating the process until a new field angle range whose difference is smaller than or equal to the threshold is generated.

In some embodiments, the determining a matching error between the first portion of the first image and the second portion of the second image based on the field angle may include: determining a point matching error between each point in the first portion of the first image and a corresponding point in the second portion of the second image; and determining the matching error based on point matching errors.

In a fifth aspect of the present disclosure, a non-transitory computer readable medium for determining a target position of a target subject is provided. The non-transitory computer readable medium, including executable instructions that, when executed by at least one processor, may direct the at least one processor to perform a method. The method may include: obtaining, by an image capturing device, at least two images for determining a target field angle of the image capturing device; obtaining a field angle range of the image capturing device; and determining the target field angle by matching the at least two images based on the field angle range.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 2 is a flowchart illustrating an exemplary process for determining a target field angle of a dome camera according to some embodiments of the present disclosure;

FIG. 8 is a flowchart illustrating an exemplary process for determining a target field angle of an image capturing device according to some embodiments of the present disclosure.

DETAILED DESCRIPTION

Figure 1:
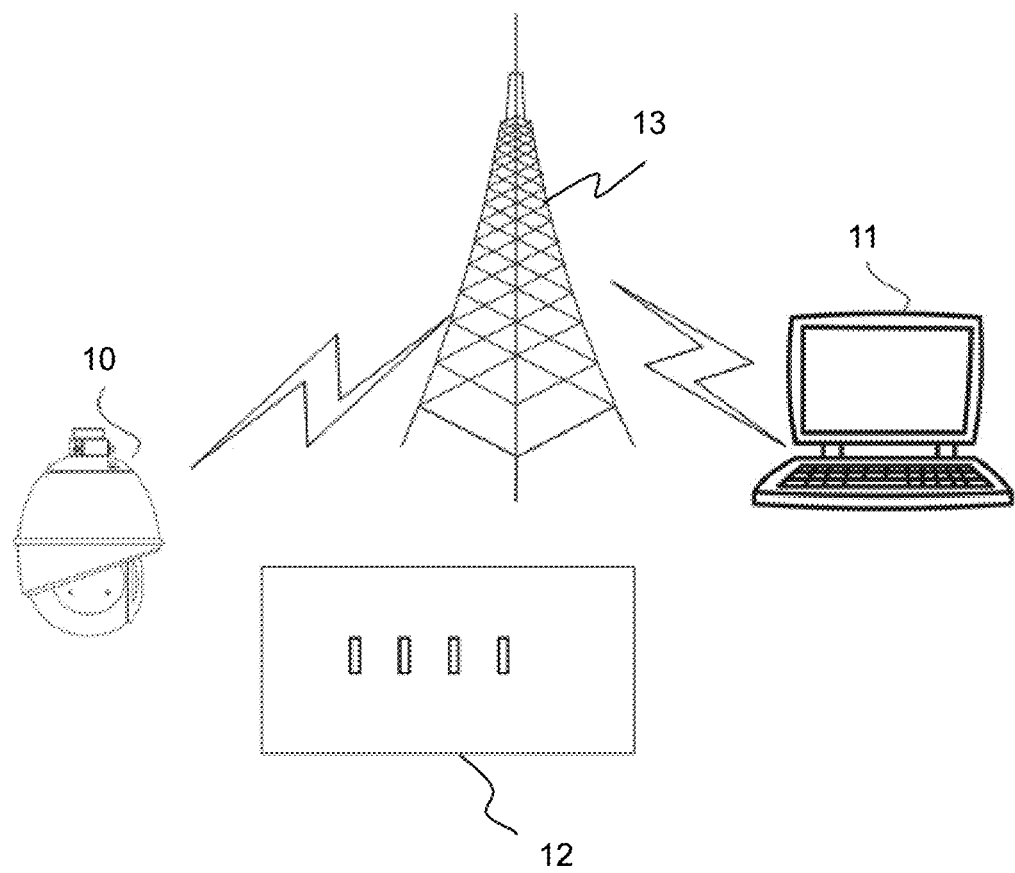
FIG. 1 is a schematic diagram illustrating an exemplary application scenario of a method for determining a field angle of a dome camera according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be inconnected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

In the prior art, the field angle of the dome camera is mainly determined manually. For example, a field angle is assumed first, then a positive/negative error of 3D positioning may be observed, and the field angle manually increases or decreases accordingly until the accuracy of the field angle meets the requirements. Alternatively, a scale is placed in front of the dome camera and read the scale captured by the dome camera. Then the scale is manually moved at a parallel distance, and read the scale captured by the dome camera at the present moment. Finally, the target field angle is determined using a trigonometric equation. Obviously, in the prior art, the process for determining the field angle of the dome camera results in high labor costs, and the process is complicated and cumbersome, and not suitable for use in many application scenarios.

The present disclosure may provide systems and methods for determining automatically a target field angle of an image capturing device (e.g., a dome camera). The method may include obtaining at least two images captured by the image capturing device. Taking the at least two images including a first image and a second image as an example, the first image and the second image may be captured in sequence by the image capturing device. The second image may be captured after rotating the image capturing device at a predetermined angle. Tilt coordinates (also referred to as "T coordinate") or pan coordinates (also referred to as "P coordinate") of the image capturing device may remain the same when the first image and the second image are captured by the image capturing device. Then the method may include obtaining a field angle range of the dome camera, and determining matching errors between overlapped pixels of the first image and the second image at different field angles within the field angle range. Further, the method may include obtaining the target field angle based on a field angle with a smallest matching error. The target field angle may thus be determined automatically, thereby reducing labor costs, and the process is simple and efficient, and suitable for use in many application scenarios. Besides, the target field angle may be more accurate than a calibration value of the field angle for the image capturing device, thereby more accurately positioning a subject using the target field angle.

It should be noted that while a dome camera is used as an example of the image capturing device for the present disclosure, the optimization of other types of image capturing devices can also utilize the methods and systems herein disclosure. For illustration purposes, the image capturing device may be any camera including a PTZ system, i.e., a PTZ camera. The PTZ camera can pan by rotating about a vertical axis, tilt by pivoting about a horizontal axis or zoom by enlarging or reduce a field of view (FOV). As used herein, the FOV may refer to a region that is visible through the PTZ camera at a particular position and orientation in the space. For illustration purposes, when the PTZ camera captures an image at the particular position and orientation in the space, the image may include objects inside the region, and not include any object outside the region. A maximum value of the FOV for the PTZ camera may be described as "target field angle" in the present disclosure.

FIG. 1 is a schematic diagram illustrating an exemplary application scenario of a method for determining a field angle of a dome camera according to some embodiments of the present disclosure. The application scenario may include a dome camera 10, a control center, and a monitoring region 12. The control center may include a terminal device 11 as shown in FIG. 1. The terminal device 11 may operate according to programs. The terminal device 11 may be a device capable of automatically processing a large amount of data in a high speed. For example, the terminal device 11 may include a computer, an iPad, a mobile phone, etc. The control center may also include a server (a server 510 as described in FIG. 5). The server may include a single server or a server cluster or a cloud computing center including a plurality of servers.

Figure 5:
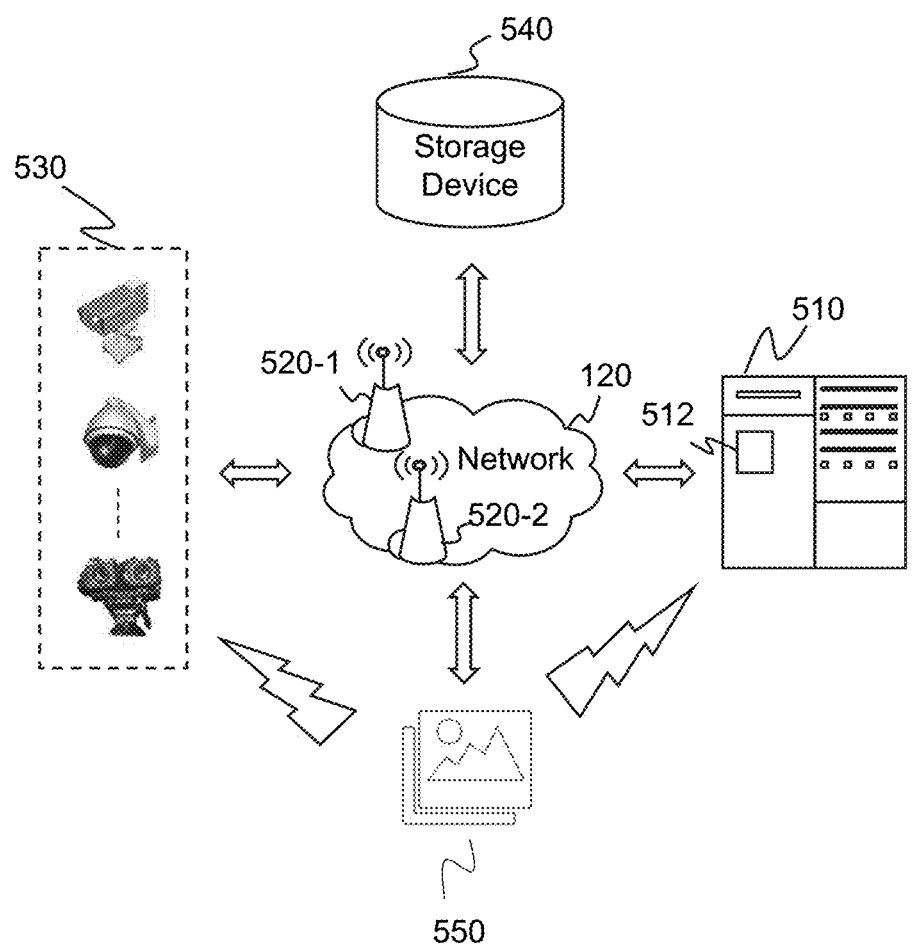
FIG. 5 is a schematic diagram illustrating an exemplary system for determining a target field angle according to some embodiments of the present disclosure.

The dome camera 10 and the terminal device 11 may be connected via a network 13 (e.g., a network 520 as described in FIG. 5). The network 13 may include a cable network, a wireline network, an optical fiber network, a telecommunications network, an intranet, the Internet, a mobile internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In the application scenario, the terminal device 11 may control the dome camera 10 to capture a first image and a second image. The second image may be captured after rotating the dome camera at a predetermined angle. The terminal device 11 may also obtain a field angle range of the dome camera. The terminal device 11 may determine matching errors between overlapped pixels of the first image and the second image at different field angles within the field angle range. The terminal device 11 may obtain a target field angle based on a field angle with a smallest matching error. As used herein, the smallest matching error may refer to a smallest absolute value of the matching errors. The target field angle may be an actual field angle of the dome camera, or an approximate of the actual field angle of the dome camera.

For example, in another possible application scenario, the dome camera 10 and the terminal device 11 may be integrated in the same device. The same device may be configured to capture the first image and the second image according to the method in the embodiment of the present disclosure. The target field angle of the dome camera may then be obtained by further processing according to the method in some embodiments.

It is should be noted that the above-mentioned application scenarios may be illustrated for ease of understanding the spirit and principles of the present disclosure, and the embodiments of the present disclosure may be non-limiting. Rather, the embodiments of the present disclosure may be applied to any suitable application scenarios.

The method for determining the target field angle of the dome camera provided by the present disclosure embodiment may be described below in connection with the application scenario as shown in FIG. 1.

FIG. 2 is a flowchart illustrating an exemplary process for determining a target field angle of a dome camera according to some embodiments of the present disclosure.

In 201, the control center (e.g., the terminal device 11) may obtain a first image and second image captured in sequence by the dome camera. The dome camera may capture the second image after rotating the dome camera at a predetermined angle. In some embodiments, the dome camera may capture the first image and the second image in real-time, or in a past time. As used herein, tilt coordinates or pan coordinates of the dome camera may remain the same when the dome camera captures the first image and the second image.

In some embodiments, the tilt coordinates or the pan coordinates of the dome camera may remain the same by controlling a PTZ system of the dome camera. The PTZ system of the dome camera may refer to a supporting component configured to mount and fix a camera in the dome camera.

In an actual application scenario, the PTZ system of the dome camera may be controlled to rotate at a horizontal direction, i.e., at a left-and-right direction, so as to rotate the dome camera at the left-and-right direction. The PTZ system of the dome camera may be controlled to rotate at an up-and-down direction so as to rotate the dome camera at the up-and-down direction. When the camera is rotated at the horizontal direction, the tilt coordinates of the dome camera may remain the same. When the camera is rotated at the up-and-down direction, the pan coordinates of the dome camera may remain the same.

In some embodiments, after the dome camera is controlled to capture the first image, the second image may be captured after horizontally rotating the dome camera at the predetermined angle, and the tilt coordinates of the dome camera may remain the same. For example, the tilt coordinates of the dome camera when the first image and the second image are captured may be zero, and the pan coordinates may be any values. After the dome camera is controlled to capture the first image, the second image may be captured after rotating the dome camera at the predetermined angle along the up-and-down direction, and the pan coordinates of the dome camera may remain the same. For example, the pan coordinates of the dome camera when the first image and the second image are captured may be zero, and the tilt coordinates may be any values.

The present disclosure may take rotating horizontally as an example, i.e., after the dome camera is controlled to capture the first image, the second image may be captured after horizontally rotating the dome camera at the predetermined angle, the tilt coordinates of the dome camera when the first image and the second image are captured may be zero, and the pan coordinates may be any values.

As used herein, the predetermined angle may be smaller than a calibration value of the field angle of the dome camera. The calibration value of the field angle may refer to an appropriate approximation for marking or identifying the field angle of the dome camera. The calibration value may be the approximation of the field angle of the dome camera generally determined by a manufacturer according to the manufacturing process. Assuming that $A_0$ represents the calibration value of the dome camera, and A represents the predetermined rotation angle. In the embodiments of the present disclosure, A may be greater than 0, and smaller than $A_0$, such that the first image and the second image may have an overlapped region, i.e., have overlapped pixels. For example, A may be $A_0/2$, etc.

In some embodiments, the control center may obtain more than two images (i.e., the first image and the second image) in sequence captured by the dome camera. The more than two images may be captured based on the process described above. In some embodiments, the control center may obtain the first image, the second image, or the more than two images from the dome camera. In some embodiments, the first image, the second image, or the more than two images from the dome camera may be presorted in a storage device, and the control center may obtain the first image, the second image, or the more than two images from the storage device. Merely by way of example, the storage device may include any storage device in the field angle determination system 100, an external storage device, etc.

In 202, the control center (e.g., the terminal device 11) may obtain a field angle range of the dome camera, determine matching errors between overlapped pixels of the first image and the second image at different field angles within the field angle range, and obtain a target field angle based on a field angle with a smallest matching error. As used herein, the smallest matching error may refer to a smallest absolute value of the matching errors.

In an actual application scenario, an error between an actual field angle of the dome camera (also referred to as "target field angle") and the calibration value $A_0$ may exist due to different generation processes. Assuming that a represents a probably maximum error. The field angle range of the dome camera may be $[(1-a)A_0, (1+a) A_0]$. a may be difference values for different dome cameras produced by different manufacturers and be non-limiting here.

After obtaining the field angle range $[(1-a)A_0, (1+a) A_0]$, the control center may determine the matching errors between the overlapped pixels of the first image and the second image at the different field angles within the field angle range, and obtain the target field angle based on the field angle with the smallest matching error. More detailed descriptions of determining the target field angle can be found elsewhere in the present disclosure, e.g., FIG. 3 and the descriptions.

Figure 3:
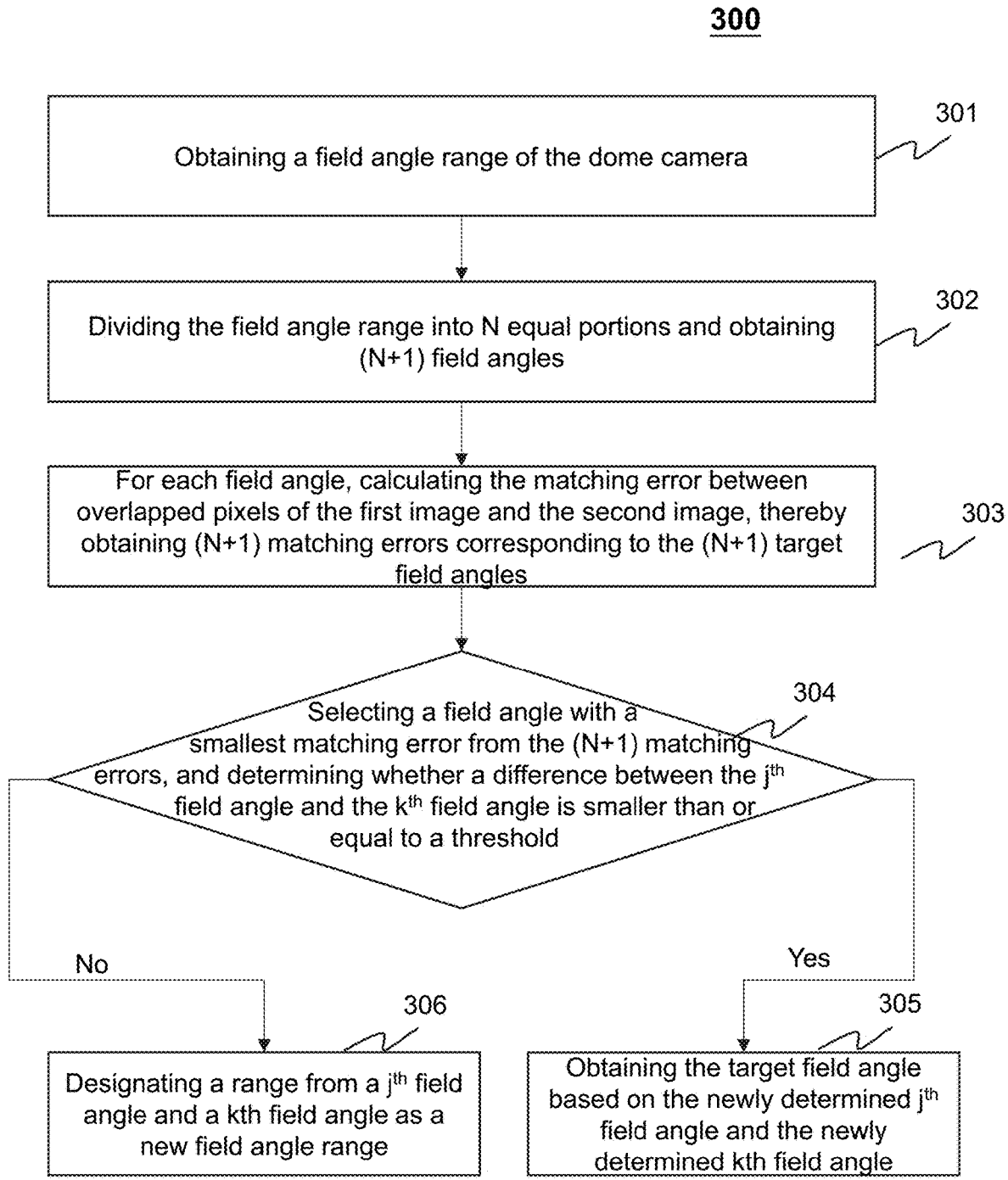
FIG. 3 is a flowchart illustrating an exemplary process for determining a target field angle of a dome camera according to some embodiments of the present disclosure.

FIG. 3 is a flowchart illustrating an exemplary process for determining a target field angle of a dome camera according to some embodiments of the present disclosure.

In 301, the control center (e.g., the terminal device 11) may obtain a field angle range of the dome camera (i.e., the field angle range of the dome camera as illustrated in 202).

In 302, the control center (e.g., the terminal device 11) may divide the field angle range into N equal portions and obtaining (N+1) field angles. The (N+1) field angles may be constituted by start points and end points of the N equal portions. In some embodiments, the control center may arrange the (N+1) field angles in order, e.g., from smallest to largest, or from largest to smallest.

In 303, for each field angle, the control center (e.g., the terminal device 11) may determining a matching error between overlapped pixels of the first image and the second image, thereby obtaining (N+1) matching errors corresponding to the (N+1) field angles.

In 304, for each field angle, the control center (e.g., the terminal device 11) may select a field angle (also referred to as "reference field angle") with a smallest matching error from the (N+1) matching errors, and determine whether a difference between the $j^{th}$ field angle and the $k^{th}$ field angle is greater than a threshold. The $j^{th}$ field angle may refer to a preceding field angle before the reference field angle, and the $k^{th}$ field angle may refer to a subsequent field angle after the reference field angle. In response to a determination that the difference between the $j^{th}$ field angle and the $k^{th}$ field angle is greater than the threshold, the process may proceed to operation 305. In response to a determination that the difference between the $j^{th}$ field angle and the $k^{th}$ field angle is smaller than or equal to the threshold, the process may proceed to operation 306.

In 305, the control center (e.g., the terminal device 11) may determine the target field angle based on the $j^{th}$ field angle and the $k^{th}$ field angle. In some embodiments, the control center may designate an average of the $j^{th}$ field angle and the $k^{th}$ field angle as the target field angle.

In 306, the control center (e.g., the terminal device 11) may designate a range from the $j^{th}$ field angle and the $k^{th}$ field angle as a newly determined field angle range, and the process may proceed to operation 303.

As used herein, N may be an integer greater than 2, and j and k may be integers greater than or equal to 1, and smaller than N.

In some embodiments, after obtaining the field angle range $[(1-a)A_0, (1+a) A_0]$, the control center may divide the field angle range into the N equal portions and obtain the (N+1) field angles. As used herein, N may be set as an integer greater than 2 according to practical demands, e.g., 10, 20, etc., and be non-limiting here.

The control center may divide the field angle range into the N equal portions and obtain the (N+1) field angles according to Equation (1) below:

$$A_i = (1-a)A_0 + i\frac{2aA_0}{N}, i = 0, 1, \ldots, N \qquad (1)$$

wherein $A_i$ represents an $i^{th}$ field angle of the (N+1) field angles, a represents the probably maximum error, $A_0$ represents the nominal value, and i represents a length of each of the equal portions.

For any field angle $A_1$ of the (N+1) field angles, the control center may determine a matching error between overlapped pixels of the first image and the second image at the field angle $A_i$. As used herein, the matching error between the overlapped pixels may also refer to a matching error of images. The smaller an absolute value of the matching error, the more the first image of the overlapped region may match the second portion of the overlapped region. The matching error may refer to a difference between coordinates of pixels in the overlapped region of the first image and corresponding pixels in the overlapped region of the second image. More detailed descriptions of determining the matching error between the overlapped pixels of the first image and the second image at the field angle $A_i$ may be found below.

Assuming that the first image obtained in operation 201 is denoted as $I_1$, and the second image is denoted as $I_2$, when the field angle is $A_i$, the control center may determine a focal length f of the dome camera according to Equation (2) below:

$$f = \frac{w}{2}\tan\left(\frac{A_i}{2}\right) \qquad (2)$$

wherein a resolution of the first image $I_1$ is W×H.

Assuming that (u,v) represents a coordinate of a pixel in the first image $I_1$ that overlaps a pixel in the second image, the control center may determine a coordinate of the pixel (x, y) in the second image according to Equation (3) below.

$$x = \frac{w}{2} + f \tan\left(\operatorname{atan}\left(\frac{u - \frac{w}{2}}{f}\right)\right), y = u \quad (3)$$

The control center may determine a point matching error between the coordinate of the pixel (u, v) in the first image $I_1$ and the coordinate of the pixel (x, y) of the second image according to Equation (4) below:

$$t = I_1(u,v) - ((x-[x]) \times I_2([x],y) + ([x+1]-x) \times I_2([x+1],y)) \quad (4)$$

wherein, [ ] represents a floor value, c represents the point matching error, and an initial value of c may be 0. If t is smaller than zero, c may be equal to (c−t). If t is larger than or equal to zero, c may be equal to (c+t). After traversing all overlapped pixels in the first image $I_1$ and the second image $I_2$, the control center may determine t of the all overlapped pixels according to Equation (3) and Equation (4). The control center may determine an average of t of the all overlapped pixels and obtain the matching error of the field angle $A_i$.

According to the process described above, the control center may determine the matching error corresponding to each of the (N+1) field angles. For example, a matching error $C_0$ may correspond to $A_0$, a matching error $C_1$ may correspond to $A_1$, and a matching error $C_{N+1}$ may correspond to $A_{N+1}$.

The control center may find the smallest matching error from $C_0$ to $C_{N+1}$. Taking N as 10 as an example, the control center may divide the field angle range [(1−a)$A_0$, (1+a) $A_0$] into 10 equal portions, thereby obtaining 11 matching errors corresponding to 11 field angles according to the process described above. A matching error $C_0$ may correspond to $A_0$, a matching error $C_1$ may correspond to $A_1$, and a matching error $C_{11}$ may correspond to $A_{11}$. The control center may find a smallest matching error from $C_0$ to $C_{11}$.

Assuming that the smallest matching error in $C_0$ to $C_{11}$ is $C_5$, and a field angle corresponding to $C_5$ is $A_5$, the control center may determine whether a difference (i.e., an absolute value of the difference) between a preceding field angle $j^{th}$ before $A_5$ and a subsequent field angle $k^{th}$ after $A_5$. As used herein, j and k may be integers greater than 1 and smaller than N, i.e., 10. Assuming that j is 4 and k is 6, the preceding field angle $j^{th}$ before $A_5$ may be $A_4$, and the subsequent field angle $k^{th}$ after $A_5$ may be $A_6$. The control center may determine whether a difference between $A_4$ and $A_6$ is smaller than or equal to the threshold. As used herein, the threshold may be selected based on practical demands for an accuracy of the field angle. For example, the threshold may be set as 0.1, 0.2, etc.

Taking 0.1 as an example, when the difference between $A_4$ and $A_6$ is smaller than or equal to 0.1, which may indicate that the smallest matching error satisfies the demand for the accuracy, the process may proceed to operation 305, i.e., the control center may determine the target field angle based on the field angle $j^{th}$ and the field angle $k^{th}$. The control center may perform operation 305 according to the process below: determining an average field angle of the field angle $j^{th}$ and the field angle $k^{th}$; designating the average as the target field angle of the dome camera, i.e., designating $$\frac{A_6 + A_4}{2}$$

as the target field angle of the dome camera. The target field angle may be noted as the target field angle determined in some embodiments.

In some embodiments, if the difference between $A_4$ and $A_6$ is greater than 0.1, which may indicate that the smallest matching error does not satisfy the demand for the accuracy, the control center may designate a range from a $j^{th}$ field angle and a $k^{th}$ field angle as a newly determined field angle range, and perform operation 303 repeatedly, i.e., dividing the field angle range from $A_4$ to $A_6$ into newly determined N equal portions, obtaining newly determined (N+1) field angles, and performing operation 303 and operation 304 for each newly determined field angle of the newly determined (N+1) field angles.

For example, N may be 10, and the control center may divide the newly determined field angle range from $A_4$ to $A_6$ into 10 equal portions, and obtain newly determined 11 field angle denoted as $A_{2,q}$. As used herein, q is denoted as 0 to 10 successively. The control center may determine matching errors $C_{2,q}$ corresponding to the field angles $A_{2,q}$ according to the Equation (3) and Equation (4) described above. A matching error $C_{2,0}$ may correspond to $A_{2,0}$, a matching error $C_{2,1}$ may correspond to $A_{2,11}$, and a matching error $C_{2,10}$ may correspond to $A_{2,10}$. The control center may find a smallest matching error from $C_{2,0}$ to $C_{2,10}$. Assuming that $C_{2,7}$ is the smallest matching error, and the field angle $A_{2,7}$ corresponds to $C_{2,7}$, the control center may determine whether a difference between a field angle $A_{2,6}$ before the field angle $A_{2,7}$ and a field angle $A_{2,8}$ after the field angle $A_{2,7}$ is smaller than or equal to the threshold 0.1. In response to a determination that difference between the field angle $A_{2,6}$ and the field angle $A_{2,8}$ is smaller than or equal to the threshold 0.1, the control center may determine the target field angle of the dome camera based on the field angle $A_{2,6}$ and the field angle $A_{2,8}$ according the process described above. In response to a determination that difference between the field angle $A_{2,6}$ and the field angle $A_{2,8}$ is greater than the threshold 0.1, the control center may designate a range from the field angle $A_{2,6}$ to the field angle $A_{2,8}$ as another newly determined field angle range and perform operation 303 and operation 304 repeatedly until a difference between another newly determined $j^{th}$ field angle and another newly determined $k^{th}$ field angle is smaller than or equal to the threshold, and the description may be not repeated here.

In the process for determining the target field angle of the dome camera described above, the control center may obtain the first image and second image captured in sequence by the dome camera. The control center may capture the second image after rotating the dome camera at the predetermined angle. As used herein, tilt coordinates or pan coordinates of the dome camera may remain the same when the dome camera captures the first image and the second image. Further, the control center may determine the matching errors between overlapped pixels of the first image and the second image at different field angles within the field angle range. The control center may obtain the target field angle based on the field angle with the smallest matching error. The control center may determine the target field angle of the dome camera automatically, thereby reducing labor costs and the process is simple and efficient, and suitable for use in many application scenarios.

Figure 4:
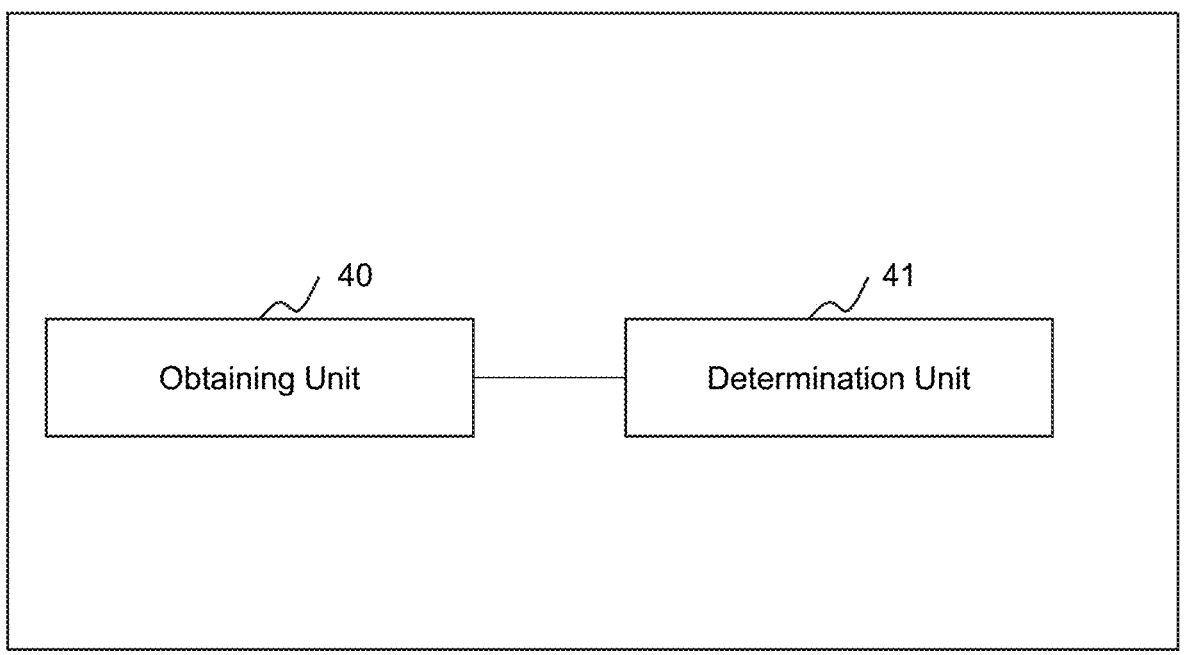
FIG. 4 is a schematic diagram illustrating an exemplary device for determining a target field angle of a dome camera according to some embodiments of the present disclosure.

Based on the same inventive concept, a device for determining a target field angle of a dome camera may be provided in some embodiments. FIG. 4 is a schematic diagram illustrating an exemplary device for determining a target field angle of a dome camera according to some embodiments of the present disclosure. A process for determining the target field angle of the dome camera may be described above and not repeated here. As shown in FIG. 4, the device 400 may include an obtaining unit and a determination unit.

The obtaining unit may be configured to obtain a first image and second image captured in sequence by the dome camera. The second image may be captured after rotating the dome camera at a predetermined angle. Tilt coordinates or pan coordinates of the dome camera may remain the same when the first image and the second image are captured by the dome camera.

The determination unit may be configured to obtain a field angle range of the dome camera, determine matching errors between overlapped pixels of the first image and the second image in different field angles within the field angle range, and obtain the target field angle based on a field angle with a smallest matching error.

In some embodiments, the determination unit may also be configured to obtain the field angle range of the dome camera and perform operations below repeatedly until a difference between a newly determined $j^{th}$ field angle and a newly determined $k^{th}$ field angle is smaller or equal to a threshold is generated, and obtain the target field angle based on the newly determined $j^{th}$ field angle and the newly determined $k^{th}$ field angle: dividing the field angle range into N equal portions and obtaining (N+1) field angles; for each field angle, determining the matching error between overlapped pixels of the first image and the second image, thereby obtaining (N+1) matching errors corresponding to the (N+1) field angles; and selecting a field angle with a smallest matching error from the (N+1) matching errors, designating a range from a $j^{th}$ field angle and a $k^{th}$ field angle as a newly determined field angle range if a difference between the $j^{th}$ field angle and the $k^{th}$ field angle is greater than a threshold, wherein the field angle with the smallest matching error from the (N+1) matching errors is before $k^{th}$ field angle and after the $j^{th}$ field angle. N may be an integer greater than 2, j and k may be integers greater than 1 and smaller than N.

In some embodiments, the determination unit may also be configured to obtain an average field angle of the newly determined $j^{th}$ field angle and the newly determined $k^{th}$ field angle; and determine the average field angle as the target field angle.

In some embodiments, if the dome camera is horizontally rotated at the predetermined angle, tilt coordinates of the dome camera may remain the same and be zero when the first image and the second image are captured by the dome camera. If the dome camera is rotated at the predetermined angle along an up-and-down direction, pan coordinates of the dome camera may remain the same when the first image and the second image are captured by the dome camera.

In some embodiments, the predetermined angle may be smaller than a nominal value of the dome camera.

The units in the device 400 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. The two units may be combined into a single unit, and any one of the units may be divided into two or more sub units. For example, the determination unit may divide into a first obtaining sub unit, a second determination subunit and a third obtaining sub unit. The first obtaining sub unit may be configured to obtain a field angle, the second determination sub unit may be configured to determine matching errors between overlapped pixels of the first image and the second image at different field angles within the field angle range, and the third obtaining sub unit may be configured to obtain a target field angle based on a field angle with a smallest matching error. As another example, the device 400 may include a storage unit (not shown) which may be used to store data generated by the above-mentioned units.

FIG. 5 is a schematic diagram illustrating an exemplary system for determining a target field angle according to some embodiments of the present disclosure. The field angle determination system 500 may include a server 510, a network 520, an image capturing device 530, a storage device 540, and images 550. The field angle determination system 500 may determine automatically a target field angle of the image capturing device 530. The target field angle may be an actual field angle of the image capturing device 530 or an approximate of the actual field angle of the image capturing device 530. A difference between the actual field angle and the approximate may satisfy a predetermined condition (e.g., smaller than a threshold). The predetermined condition may be determined based on practical demands.

The server 510 may be a single server or a server group. The server group may be centralized, or distributed (e.g., server 510 may be a distributed system). In some embodiments, the server 510 may be local or remote. For example, the server 510 may access information and/or data stored in the image capturing device 530, and/or the storage device 540 via the network 520. As another example, the server 510 may be directly connected to the image capturing device 530, and/or the storage device 540 to access stored information and/or data. In some embodiments, the server 510 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 510 may be implemented on a computing device 600 having one or more components illustrated in FIG. 6 in the present disclosure.

In some embodiments, the server 510 may include a processing device 512. The processing device 512 may process information and/or data to perform one or more functions described in the present disclosure. For example, the processing device 512 may determine a target field angle of the image capturing device 530 by matching at least two images based on a field angle range of the image capturing device 530. In some embodiments, the processing device 512 may include one or more processing devices (e.g., single-core processing device(s) or multi-core processor(s)). Merely by way of example, the processing device 512 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 520 may facilitate the exchange of information and/or data. In some embodiments, one or more components of the field angle determination system 500 (e.g., the server 510, the image capturing device 530, the storage device 540) may exchange information and/or data with other component(s) of the field angle determination system 500 via the network 520. For example, the server 510 may obtain information and/or data from the image capturing device 530 via the network 520. In some embodiments, the network 520 may be any type of wired or wireless network, or a combination thereof. Merely by way of example, the network 520 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 520 may include one or more network access points. For example, the network 520 may include wired or wireless network access points such as base stations and/or internet exchange points 520-1, 520-2, . . . , through which one or more components of the field angle determination system 500 may be connected to the network 520 to exchange data and/or information.

The image capturing device 530 may capture the images 550. In some embodiments, the image capturing device 530 may capture the images 550 at different views. The images 550 may include at least two images. Taking the images 550 including a first image and a second image as an example, the image capturing device 530 may capture the first image of a first region at a first view. After the image capturing device 530 is rotated at a predetermined angle, the image capturing device 530 may obtain the second image of a second region at a second view. In some embodiments, the first region and the second region may have an overlapped region, and a first portion of the first image corresponding to the overlapped region may overlap a second portion of the second image corresponding to the overlapped region. Each first point in the first portion of the first image may correspond to a second point in the second portion of the second image, and the first point and the corresponding second point may represent the same location in the overlapped region.

In some embodiments, the second view may be obtained by horizontally rotating the first view or vertically rotating the first view at the predetermined angle. If the image capturing device 530 is horizontally rotated at the predetermined angle, tilt coordinates of the image capturing device 530 may remain the same when the first image and the second image are captured by the image capturing device 530. If the dome camera is vertically rotated at the predetermined angle, pan coordinates of the image capturing device 530 may remain the same when the first image and the second image are captured by the image capturing device 530.

For illustration purpose, the image capturing device 530 may include a video camera, e.g., a dome camera. In some embodiments, the image capturing device 530 may be a smart device including or connected to a camera. The smart device may include a smart phone, a smart home device (e.g., a smart lighting device, a smart television,), an intelligent robot (e.g., a sweeping robot, a mopping robot, a chatting robot, an industry robot), etc.

The storage device 540 may store data and/or instructions. In some embodiments, the storage device 540 may store data obtained from the image capturing device 530. In some embodiments, the storage device 540 may store data and/or instructions that the server 510 may execute or use to perform exemplary methods described in the present disclosure. In some embodiments, the storage device 540 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 540 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 540 may be connected to the network 520 to communicate with one or more components of the field angle determination system 500 (e.g., the server 510, the image capturing device 530, etc.). One or more components of the field angle determination system 500 may access the data or instructions stored in the storage device 540 via the network 520. In some embodiments, the storage device 540 may be directly connected to or communicate with one or more components of the field angle determination system 500 (e.g., the server 510, the image capturing device 530, etc.). In some embodiments, the storage device 540 may be part of the server 510.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 540 may be a data storage including cloud computing platforms, such as, public cloud, private cloud, community, and hybrid clouds, etc. However, those variations and modifications do not depart the scope of the present disclosure.

Figure 6:
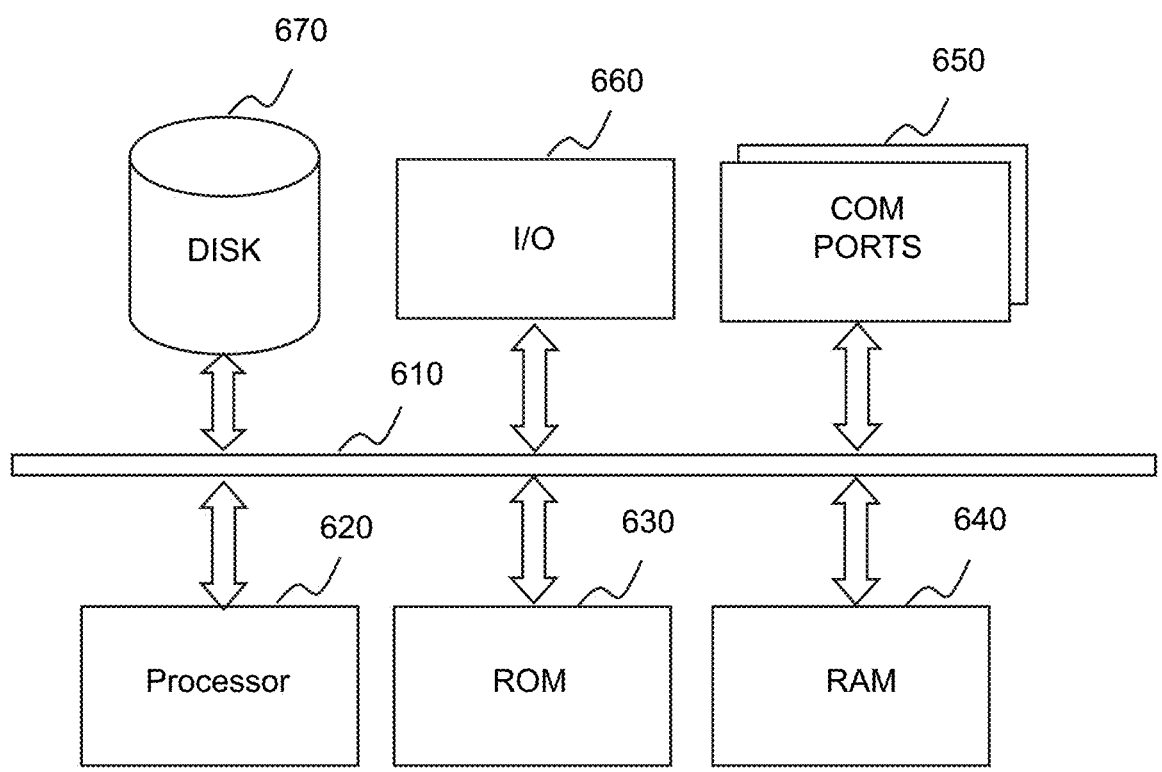
FIG. 6 is a schematic diagram illustrating exemplary hardware and/or software components of a computing device according to some embodiments of the present disclosure.

FIG. 6 is a schematic diagram illustrating exemplary hardware and/or software components of a computing device 600 according to some embodiments of the present disclosure. In some embodiments, the server 510, and/or the image capturing device 530 may be implemented on the computing device 600. For example, the processing device 512 may be implemented on the computing device 600 and configured to perform functions of the processing device 512 disclosed in this disclosure.

The computing device 600 may be used to implement any component of the field angle determination system 500 as described herein. For example, the processing device 512 may be implemented on the computing device 600, via its hardware, software program, firmware, or a combination thereof. Although only one such computer is shown, for convenience, the computer functions relating to the action recognition as described herein may be implemented in a distributed fashion on a number of similar platforms to distribute the processing load.

The computing device 600, for example, may include COM ports 650 connected to and from a network connected thereto to facilitate data communications. The computing device 600 may also include a processor 620, in the form of one or more processors (e.g., logic circuits), for executing program instructions. For example, the processor 620 may include interface circuits and processing circuits therein. The interface circuits may be configured to receive electronic signals from a bus 610, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 610.

The computing device 600 may further include program storage and data storage of different forms including, for example, a disk 670, and a read only memory (ROM) 630, or a random access memory (RAM) 640, for various data files to be processed and/or transmitted by the computing device. The exemplary computer platform may also include program instructions stored in the ROM 630, RAM 640, and/or other type of non-transitory storage medium to be executed by the processor 620. The methods and/or processes of the present disclosure may be implemented as the program instructions. The computing device 600 also includes an I/O component 660, supporting input/output between the computer and other components. The computing device 600 may also receive programming and data via network communications.

Merely for illustration, only one processor is described in FIG. 6. Multiple processors are also contemplated, thus operations and/or method steps performed by one processor as described in the present disclosure may also be jointly or separately performed by the multiple processors. For example, if in the present disclosure the processor of the computing device 600 executes both step A and step B, it should be understood that step A and step B may also be performed by two different CPUs and/or processors jointly or separately in the computing device 600 (e.g., the first processor executes step A and the second processor executes step B, or the first and second processors jointly execute steps A and B).

Figure 7:
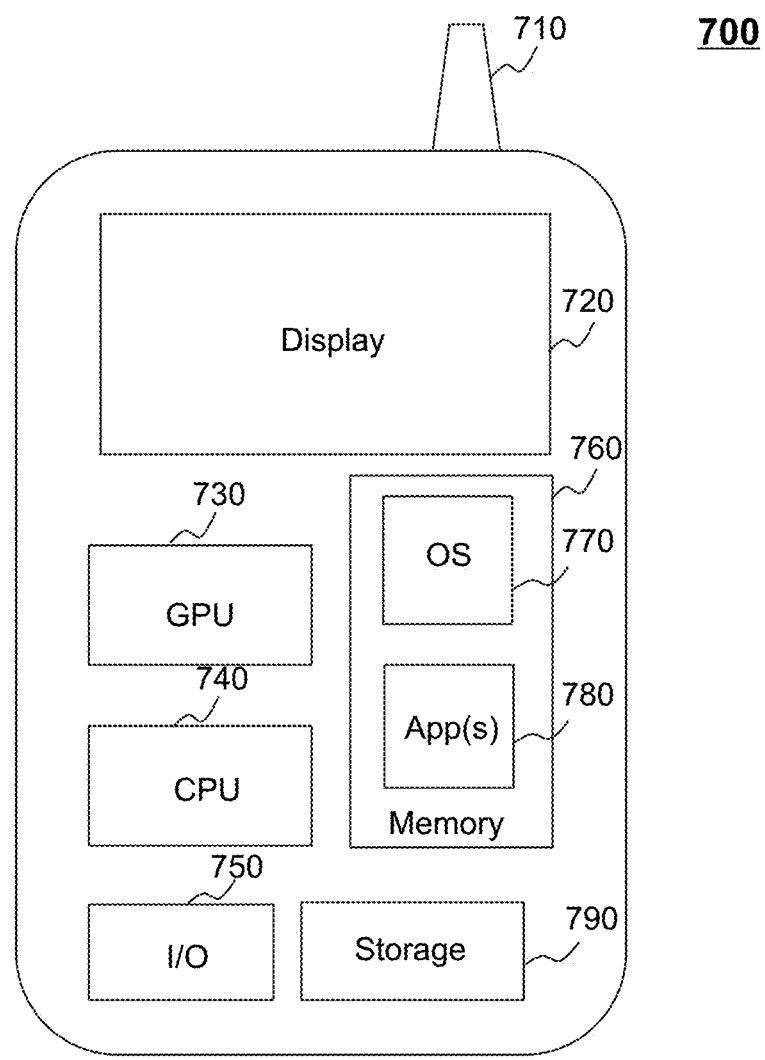
FIG. 7 is a schematic diagram illustrating exemplary hardware and/or software components of a mobile device according to some embodiments of the present disclosure.

FIG. 7 is a schematic diagram illustrating exemplary hardware and/or software components of a mobile device 700 on which the image capturing device 530, or part of the image capturing device 530 may be implemented according to some embodiments of the present disclosure. As illustrated in FIG. 7, the mobile device 700 may include a communication platform 710, a display 720, a graphic processing unit (GPU) 730, a central processing unit (CPU) 740, an I/O 750, a memory 760, a mobile operating system (OS) 770, and a storage 790. In some embodiments, any other suitable component, including but not limited to a system bus or a controller (not shown), may also be in the mobile device 700.

In some embodiments, the mobile operating system 770 (e.g., iOS™, Android™' Windows Phone™, etc.) and one or more applications 780 may be loaded into the memory 760 from the storage 790 in order to be executed by the CPU 740. The applications 780 may include a browser or any other suitable mobile apps for receiving and rendering information relating to action recognition or other information from the field angle determination system 500. User interactions with the information stream may be achieved via the I/O 750 and provided to the processing device 512 and/or other components of the field angle determination system 500 via the network 520.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

FIG. 8 is a flowchart illustrating an exemplary process for determining a target field angle of an image capturing device according to some embodiments of the present disclosure. In some embodiments, process 800 may be implemented as a set of instructions (e.g., an application) stored in the storage ROM 630 or RAM 640. The processor 620 may execute the set of instructions, and when executing the instructions, the processor 620 may be configured to perform process 800. The operations of the illustrated process presented below are intended to be illustrative. In some embodiments, process 800 may be accomplished with one or more additional operations not described and/or without one or more of the operations herein discussed. Additionally, the order in which the operations of the process as illustrated in FIG. 8 and described below is not intended to be limiting.

In 810, the processing device 512 may obtain at least two images by the image capturing device 530. As described in connection with FIGS. 1-2, the image capturing device 530 may capture the at least two images at difference views, and at least a portion of each of the at least two images may overlap each other. Taking the at least two images including a first image and a second image as an example, the image capturing device 530 may capture the first image of a first region at a first view. After the image capturing device 530 is rotated at a predetermined angle, the image capturing device 530 may obtain the second image of a second region at a second view. The first region and the second region may have an overlapped region, and a first portion of the first image corresponding to the overlapped region may overlap a second portion of the second image corresponding to the overlapped region. Each first point in the first portion of the first image may correspond to a second point in the second portion of the second image, and the first point and the corresponding second point may represent the same position in the overlapped region.

In some embodiments, the second view may be obtained by horizontally rotating the first view or vertically rotating the first view at the predetermined angle. In some embodiments, the predetermined angle may be associated with a field angle range of the image capturing device. More detail descriptions of the field angle range can be found elsewhere in the present disclosure, e.g., operation 820 and the descriptions thereof.

In some embodiments, the image capturing device 530 may capture the at least two images in real-time, or in a past time. In some embodiments, the processing device 512 may obtain the at least two images directly from the image capturing device 530. In some embodiments, the at least two images may be stored in a storage device, and the processing device 512 may obtain the at least two images from the storage device. Merely by way of example, the storage device may include any storage device disclosed in the present disclosure, e.g., the storage device 540, the ROM 630, the RAM 640, an external storage device, etc.

In 820, the processing device 512 may obtain the field angle range of the image capturing device 530. As described in connection with FIG. 2, the field angle range may be associated with a calibration value of the field angle of the image capturing device. As used herein, the calibration value may refer to an appropriate approximation for marking or identifying a field angle of an image capturing device.

Generally, the calibration value may be determined by a manufacturer according to a manufacturing process. In an actual application scenario, an actual field angle of the image capturing device may be not the same as the calibration value. An error between the actual field angle of the image capturing device and the calibration value may exist, and the field angle range may be determined based on the calibration value and the error. In some embodiments, the error may be different values for different image capturing devices generated by different process. Assuming that a represents a probably maximum error, and $A_0$ represents the calibration value, the field angle range of the image capturing device may be $[(1-a)A_0, (1+a) A_0]$.

In some embodiments, the processing device 512 may obtain the field angle range directly from the image capturing device. In some embodiments, the field angle range may be stored in a storage device, and the processing device 512 may obtain the field angle range from the storage device. Merely by way of example, the storage device may include any storage device disclosed in the present disclosure, e.g., the storage device 540, the ROM 630, the RAM, an external storage device, etc.

In 830, the processing device 512 may determine the target field angle by matching the at least two images based on the field angle range. In some embodiments, the processing device 512 may determine the target field angle by matching the first portion of the first image and the second portion of the second image based on the field angle range. The processing device 512 may determine a matching error between the first portion of the first image and the second portion of the second image. The smaller an absolute value of the matching error is, the more the first portion of the first image may match the second portion of the second image. In some embodiments, the processing device 512 may determine the matching error based on point matching errors between each point in the first portion of the first image and a corresponding point in the second portion of the second image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the processing device 512 may perform operation 820 before operation 810, or simultaneously perform operation 810 and 820.

Figure 9:
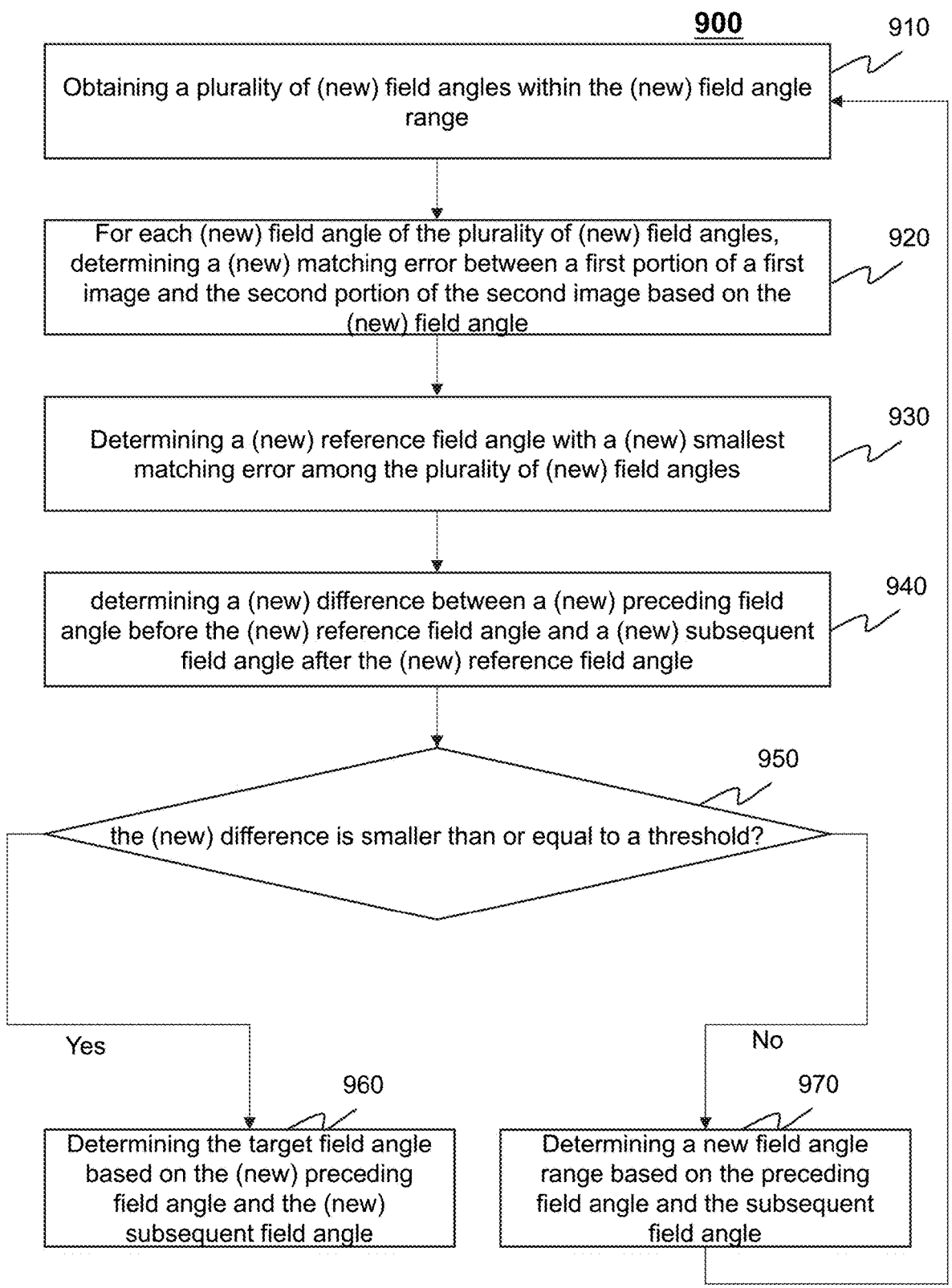
FIG. 9 is a flowchart illustrating an exemplary process for determining a target field angle of an image capturing device according to some embodiments of the present disclosure.

FIG. 9 is a flowchart illustrating an exemplary process for determining a target field angle of an image capturing device according to some embodiments of the present disclosure. In some embodiments, process 900 may be implemented as a set of instructions (e.g., an application) stored in the storage ROM 630 or RAM 640. The processor 620 may execute the set of instructions, and when executing the instructions, the processor 620 may be configured to perform process 900. The operations of the illustrated process presented below are intended to be illustrative. In some embodiments, process 900 may be accomplished with one or more additional operations not described and/or without one or more of the operations herein discussed. Additionally, the order in which the operations of the process as illustrated in FIG. 9 and described below is not intended to be limiting.

In 910, the processing device 512 may obtain a plurality of field angles within a field angle range. In some embodiments, the processing device 512 may divide the field angle range into a plurality of portions (e.g., equal portions), and determine start points and end points of the plurality of portions as the plurality of field angles.

In 920, for each field angle of the plurality of field angles, the processing device 512 may determine a matching error between a first portion of a first image and the second portion of the second image based on the field angle. More detailed descriptions of determining the matching error can be found elsewhere in the present disclosure, e.g., FIG. 2 and the descriptions thereof.

In 930, the processing device 512 may determine a reference field angle with a smallest matching error among the plurality of field angles. As used herein, the smallest matching error may refer to a smallest absolute value of the matching errors. The processing device 512 may further determine a difference (i.e., an absolute value of the difference) between a preceding field angle before the reference field angle and a subsequent field angle after the reference field angle in 940. For example, if the reference field angle is an $i^{th}$ field angle, the preceding field angle may be an $(i-1)^{th}$ field angle, and the subsequent field angle may be $(i+1)^{th}$ field angle.

In 950, the processing device 512 may determine whether the difference is smaller than or equal to a threshold. In response to a determination that the difference is smaller than or equal to the threshold, the processing device 512 may determine the target field angle based on the preceding field angle and the subsequent field angle. In some embodiments, the processing device 512 may determine an average between the preceding field angle and the subsequent field angle, and designate the average as the target field angle. In response to a determination that the difference is greater than the threshold, the processing device 512 may determine a new field angle range based on the preceding field angle and the subsequent field angle, and the processing device 512 may execute process 900 to return to operation 910 to determine a plurality of new field angle within the new field angle range. As used herein, the new field angle range may include a range from the preceding field angle to the subsequent field angle.

Further, the processing device 512 may determine whether a new difference associated with the new field angle range is smaller than or equal to the threshold. In response to a determination that the new difference is smaller than or equal to the threshold, the processing device 512 may determine the target field angle based on a new preceding field angle associated with the new field angle range and a new subsequent field angle associated with the new field angle range. In response to a determination that the new difference is greater than the threshold, the processing device 512 may still execute process 900 to return to operation 910 to determine another new field angle range based on the new preceding field angle and the new subsequent field angle unit another new difference associated with the another new field angle range is smaller than or equal to the threshold.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

It should be noted that the above description is merely provided for the purposes of illustration, and not intended to limit the scope of the present disclosure. For persons having ordinary skills in the art, multiple variations or modifications may be made under the teachings of the present disclosure.

However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

We claim:

1. A system for determining automatically a field angle of an image capturing device, comprising:
    at least one storage medium including a set of instructions; and
    at least one processor in communication with the at least one storage medium, wherein when executing the set of instructions, the at least one processor is directed to:
        obtain, by an image capturing device, at least two images for determining a target field angle of the image capturing device, wherein the at least two images include a first image obtained in a first view and a second image obtained in a second view, and a first portion of the first image overlaps a second portion of the second image;
        obtain a field angle range of the image capturing device; and
        determine the target field angle by matching the first portion of the first image and the second portion of the second image based on the field angle range.

2. The system of claim 1, wherein to determine the target field angle by matching the first portion of the first image and the second portion of the second image based on the field angle range, the at least one processor is directed to:
    initiate an iteration process for determining the target field angle, a first iteration in the iteration process including:
        obtaining a plurality of field angles within the field angle range;
        for each field angle of the plurality of field angles, determining a matching error between the first portion of the first image and the second portion of the second image based on the field angle;

determining a reference field angle with a smallest matching error among the plurality of field angles;

determining a difference between a preceding field angle before the reference field angle and a subsequent field angle after the reference field angle;

in response to a determination that the difference is smaller than or equal to a threshold, determining the target field angle based on the preceding field angle and the subsequent field angle; and in response to a determination that the difference is greater than the threshold, determining a new field angle range based on the preceding field angle and the subsequent field angle, and performing a next iteration based on the new field angle range.

3. The system of claim 2, wherein the at least one processor is directed to terminate the iteration process until a difference between a preceding field angle before a reference field angle and a subsequent field angle after the reference field angle generated in an iteration is smaller than or equal to the threshold is generated.

4. The system of claim 2, wherein the determining a matching error between the first portion of the first image and the second portion of the second image based on the field angle includes:

determining a point matching error between each point in the first portion of the first image and a corresponding point in the second portion of the second image; and determining the matching error based on point matching errors.

5. The system of claim 2, wherein the determining the target field angle based on the preceding field angle and the subsequent field angle includes:

determining an average between the preceding field angle and the subsequent field angle; and designating the average as the target field angle.

6. The system of claim 1, wherein the second view is obtained by horizontally rotating the first view or vertically rotating the first view at a predetermined angle.

7. A method implemented on a computing device having at least one processor, at least one storage medium, and a communication platform connected to a network, the method comprising:

obtaining, by an image capturing device, at least two images for determining a target field angle of the image capturing device, wherein the at least two images include a first image obtained in a first view and a second image obtained in a second view, and a first portion of the first image overlaps a second portion of the second image;

obtaining a field angle range of the image capturing device; and determining the target field angle by matching the first portion of the first image and the second portion of the second image based on the field angle range.

8. The method of claim 7, wherein the determining the target field angle by matching the first portion of the first image and the second portion of the second image based on the field angle range includes:

initiating an iteration process for determining the target field angle, a first iteration in the iteration process including:

obtaining a plurality of field angles within the field angle range;

for each field angle of the plurality of field angles, determining a matching error between the first portion of the first image and the second portion of the second image based on the field angle;

determining a reference field angle with a smallest matching error among the plurality of field angles;

determining a difference between a preceding field angle before the reference field angle and a subsequent field angle after the reference field angle;

in response to a determination that the difference is smaller than or equal to a threshold, determining the target field angle based on the preceding field angle and the subsequent field angle; and in response to a determination that the difference is greater than the threshold, determining a new field angle range based on the preceding field angle and the subsequent field angle, and performing a next iteration based on the new field angle range.

9. The method of claim 8, wherein the determining a matching error between the first portion of the first image and the second portion of the second image based on the field angle includes:

determining a point matching error between each point in the first portion of the first image and a corresponding point in the second portion of the second image; and determining the matching error based on point matching errors.

10. The method of claim 8, wherein the determining the target field angle based on the preceding field angle and the subsequent field angle includes:

determining an average between the preceding field angle and the subsequent field angle; and designating the average as the target field angle.

11. The method of claim 8, wherein the determining the target field angle by matching the first portion of the first image and the second portion of the second image based on the field angle range further includes:

terminating the iteration process until a difference between a preceding field angle before a reference field angle and a subsequent field angle after the reference field angle generated in an iteration is smaller than or equal to the threshold is generated.

12. The method of claim 7, wherein the second view is obtained by horizontally rotating the first view or vertically rotating the first view at a predetermined angle.

13. A non-transitory computer readable medium, comprising executable instructions that, when executed by at least one processor, directs the at least one processor to perform a method, the method comprising:

obtaining, by an image capturing device, at least two images for determining a target field angle of the image capturing device, wherein the at least two images include a first image obtained in a first view and a second image obtained in a second view, and a first portion of the first image overlaps a second portion of the second image;

obtaining a field angle range of the image capturing device; and determining the target field angle by matching the first portion of the first image and the second portion of the second image based on the field angle range.

14. The non-transitory computer readable medium of claim 13, wherein the determining the target field angle by matching the first portion of the first image and the second portion of the second image based on the field angle range includes:

initiating an iteration process for determining the target field angle, a first iteration in the iteration process including:

obtaining a plurality of field angles within the field angle range;

for each field angle of the plurality of field angles, determining a matching error between the first portion of the first image and the second portion of the second image based on the field angle;

determining a reference field angle with a smallest matching error among the plurality of field angles;

determining a difference between a preceding field angle before the reference field angle and a subsequent field angle after the reference field angle;

in response to a determination that the difference is smaller than or equal to a threshold, determining the target field angle based on the preceding field angle and the subsequent field angle; and in response to a determination that the difference is greater than the threshold, determining a new field angle range based on the preceding field angle and the subsequent field angle, and performing a next iteration based on the new field angle range.

15. The non-transitory computer readable medium of claim 14, wherein the determining the target field angle by matching the first portion of the first image and the second portion of the second image based on the field angle range further includes:

terminating the iteration process until a difference between a preceding field angle before a reference field angle and a subsequent field angle after the reference field angle generated in an iteration is smaller than or equal to the threshold is generated.

16. The non-transitory computer readable medium of claim 14, wherein the determining a matching error between the first portion of the first image and the second portion of the second image based on the field angle includes:

determining a point matching error between each point in the first portion of the first image and a corresponding point in the second portion of the second image; and determining the matching error based on point matching errors.

17. The non-transitory computer readable medium of claim 14, wherein the determining the target field angle based on the preceding field angle and the subsequent field angle includes:

determining an average between the preceding field angle and the subsequent field angle, and designating the average as the target field angle.

* * * * *